US006445596B1

(12) United States Patent
Mihara et al.

(10) Patent No.: US 6,445,596 B1
(45) Date of Patent: Sep. 3, 2002

(54) MAGNETRON DRIVE POWER SUPPLY

(75) Inventors: Makoto Mihara; Hisashi Morikawa, both of Nara; Takeshi Irii, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/762,742

(22) PCT Filed: Jun. 14, 2000

(86) PCT No.: PCT/JP00/03865

§ 371 (c)(1),
(2), (4) Date: Apr. 12, 2001

(87) PCT Pub. No.: WO00/78099

PCT Pub. Date: Dec. 21, 2000

(30) Foreign Application Priority Data

Jun. 15, 1999 (JP) .......................................... 11-167923

(51) Int. Cl.[7] .......................... H02M 3/335; H02M 1/12
(52) U.S. Cl. ....................................... 363/21.01; 363/39
(58) Field of Search ............................. 363/39, 40, 20, 363/21.01

(56) References Cited

U.S. PATENT DOCUMENTS

| | | | | | |
|---|---|---|---|---|---|
| 4,988,922 | A | * | 1/1991 | Shoda et al. | 315/223 |
| 5,053,682 | A | * | 10/1991 | Shoda et al. | 315/223 |
| 5,115,168 | A | * | 5/1992 | Shoda et al. | 315/223 |
| 5,189,602 | A | * | 2/1993 | Callier et al. | 363/28 |
| 5,451,750 | A | | 9/1995 | An | |

FOREIGN PATENT DOCUMENTS

| | | |
|---|---|---|
| EP | 0 921 712 | 6/1999 |

* cited by examiner

*Primary Examiner*—Bao Q. Vu
(74) *Attorney, Agent, or Firm*—Pearne & Gordon LLP

(57) ABSTRACT

High-voltage diodes (6) and (7) and high-voltage capacitors (8) and (9) making up a high-voltage circuit are connected and are molded of a resin (22) except that terminals (21*a*) and (21*b*) are drawn out as a small-sized high-voltage module (23) in one piece.

10 Claims, 6 Drawing Sheets

MAGNETRON DRIVE POWER SUPPLY

This application claims the benefit of International Application Number PCT/JP00/03865, which was published in English.

FIELD OF THE INVENTION

This invention relates to a high-frequency heater using a magnetron to execute dielectric heating, such as a microwave oven, and more particularly to an inverter power unit for converting a commercial power supply into a high-frequency, high-voltage power supply for driving a magnetron.

BACKGROUND OF THE INVENTION

Hitherto, for the inverter power unit for converting a commercial power supply into a high-frequency, high-voltage power supply for driving a magnetron, the Unexamined Japanese Patent Application Publication No. Hei 5-121159 discloses a monolithic voltage resonance inverter of a single-terminal type. The inverter power unit converts power converted into a high frequency by the inverter into a high voltage through a step-up transformer and generates a high DC voltage appropriate for driving the magnetron by a high-voltage circuit using multiplication voltage rectification or a rectifier circuit, whereby the step-up transformer can be miniaturized by converting power into a high frequency by the inverter and the circuitry is formed on a single board, so that a compact and lightweight magnetron drive power supply (inverter power supply) can be provided.

FIG. 6 is a block diagram of inverter circuitry in related art from the top thereof. In the figure, numeral 1 denotes an inverter block implemented as an inverter, numeral 2 denotes a control block for controlling the inverter, numeral 3 denotes a step-up transformer block, and numeral 4 denotes a high-voltage circuit; the parts are mounted on one printed circuit board 5 for providing a compact and lightweight configuration.

However, there is a problem of widening the circuit mounting area to provide the insulating distances of a high-voltage circuit as a factor of impairing the merits of miniaturization. FIG. 7 is an external view to show the high-voltage circuit portion. The high-voltage circuit 4 is made up of high-voltage diodes 6 and 7, high-voltage capacitors 8 and 9, a tab terminal 11 for connecting a lead for feeding power into a magnetron filament, and a discharge resistor 10 for discharging high-voltage charges charged into high-voltage capacitors 8 and 9 when the magnetron fails. A high voltage of 3 to 4.5 kV or transiently about 7 kV occurs between the terminals of the parts making up the high-voltage circuit 4. of course, the high-voltage circuit 4 must be designed with appropriate insulating distances to provide insulation. Assuming also the possibilities of deposition of dust and moisture absorbed in the dust because of dew condensation thereon, etc., the insulating distances with a more margin are required and the mounting area of the high-voltage circuit 4 becomes fairly wide. Thus, the circuitry mounting area cannot be miniaturized; this is a problem.

DISCLOSURE OF THE INVENTION

It is therefore an object of the invention to provide a magnetron drive power supply comprising: a step-up transformer for stepping up output of the inverter section, and a high-voltage circuit comprising two high-voltage capacitors in bare-chip status and two high-voltage diodes for a full-wave voltage doubler rectifying output of the step-up transformer, wherein the high-voltage circuit is provided as a unit molded of a resin.

According to an aspect of the invention, there is provided with a magnetron drive power supply comprising:

a unilateral power supply for converting a commercial power supply into a unilateral power supply, a rectification filter section for rectifying and smoothing the unilateral power supply, an inverter section for converting the unilateral power supply provided through the rectification filter section into a high-frequency AC voltage as at least one semiconductor switching element is turned on/off, a step-up transformer for stepping up output of the inverter section, and a high-voltage circuit comprising two high-voltage capacitors in bare-chip status and two high-voltage diodes for a full-wave voltage doubler rectifying output of the step-up transformer, wherein the high-voltage circuit is provided as a unit molded of a resin.

According to the invention, while the parts making up the high-voltage circuit are brought close to each other, are connected, and are integrated at a high density, the insulation performance of the high-voltage circuit can be provided because of the resin mold, a compact magnetron drive power supply can be provided, and a machine chamber can be made small. Thus, a high-frequency heater having a compact outside shape and enlarged oven dimensions can be provided and the user's flexibility of installation can be enhanced.

PREFERRED EMBODIMENTS OF THE INVENTION

First Embodiment

Figure 1:
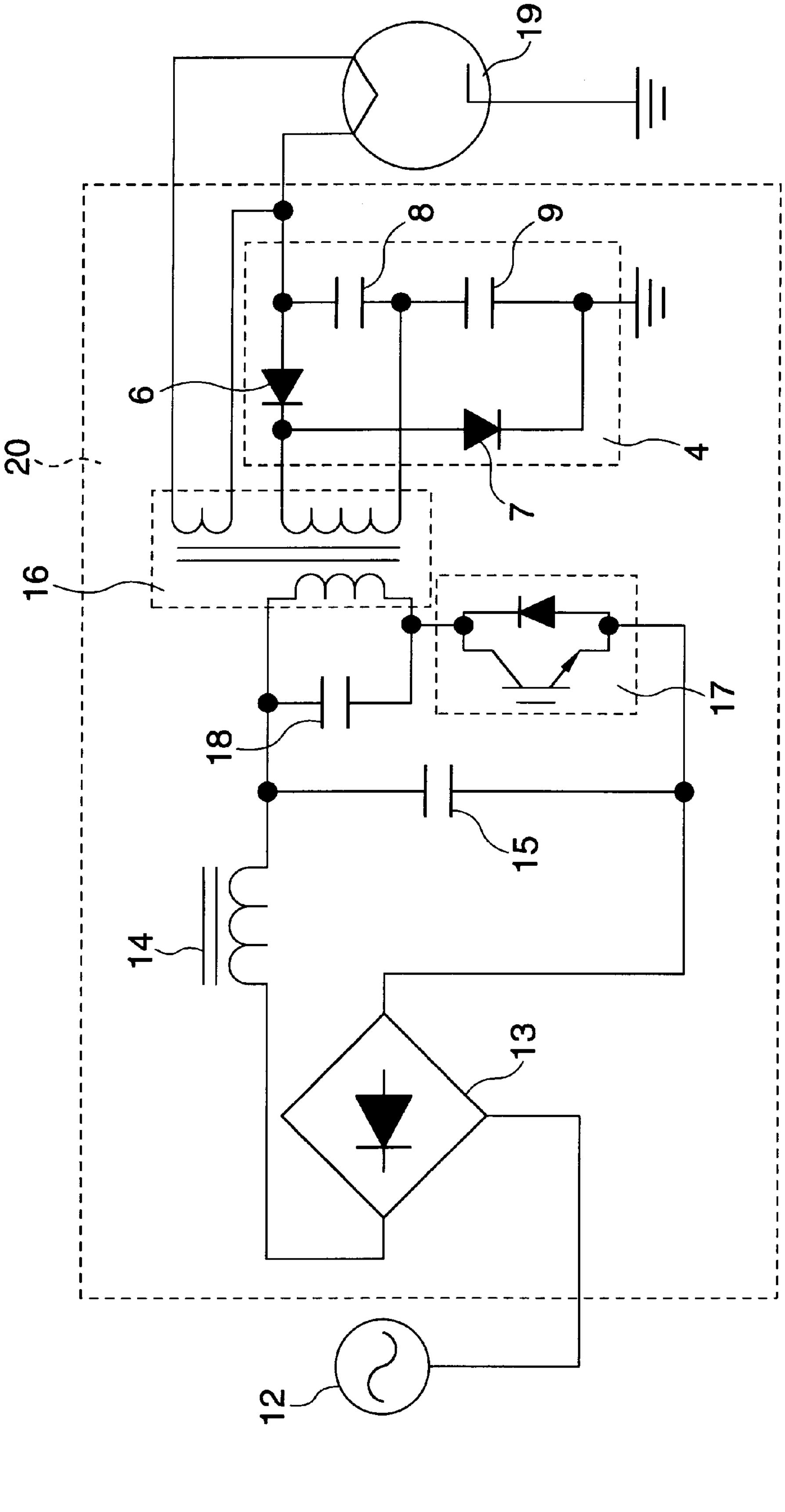
FIG. 1 is a circuit diagram of an inverter power supply in a first embodiment of the invention.

A first embodiment of the invention will be discussed with reference to the accompanying drawings. FIG. 1 is a circuit diagram of a magnetron drive power supply, which will be hereinafter referred to as inverter power supply, indicating the first embodiment of the invention. It comprises a unilateral power supply 13 for converting a commercial power supply 12 into a unilateral power supply and a choke coil 14 and a smoothing capacitor 15 for rectifying and smoothing the unilateral power supply as a rectifier filter. DC voltage generated by the parts is applied to the primary side of a step-up transformer 16 as a semiconductor switching element 17 is turned on. Meanwhile an electric current flows into leakage inductance and energy is accumulated. Generally, an insulated gate bipolar transistor (IGBT) is used as the semiconductor switching element 17.

If the semiconductor switching element 17 is turned off after one time, resonance occurs in a tank circuit of a resonance capacitor 18 and inductance component and a resonance voltage is applied to the primary side of the transformer. AC voltage is applied to the step-up transformer 16 according to the on and off cycle.

The on and off cycle is speeded up, whereby a high-frequency AC voltage is applied to the primary side of the step-up transformer 16. The commercial power supply is thus converted into high-frequency power supply. A high-voltage circuit 4 implemented as a full-wave voltage doubler circuit converts secondary high-frequency high voltage into a high DC voltage and applies the voltage to a magnetron 19. The high-voltage circuit 4 is a known full-wave voltage doubler circuit made up of high-voltage diodes 6 and 7 and high-voltage capacitors 8 and 9 and therefore the detailed operation principle will not be discussed. A discharge resistor 10 is, so to speak, a serviceman protection resistor for discharging high-voltage charges accumulated in the high-voltage capacitors 8 and 9 because the high-voltage charges are not discharged if the magnetron 19 is open-destroyed. The inverter power supply 20 is made up of the components and the magnetron 19 generates microwaves.

Figure 2A:
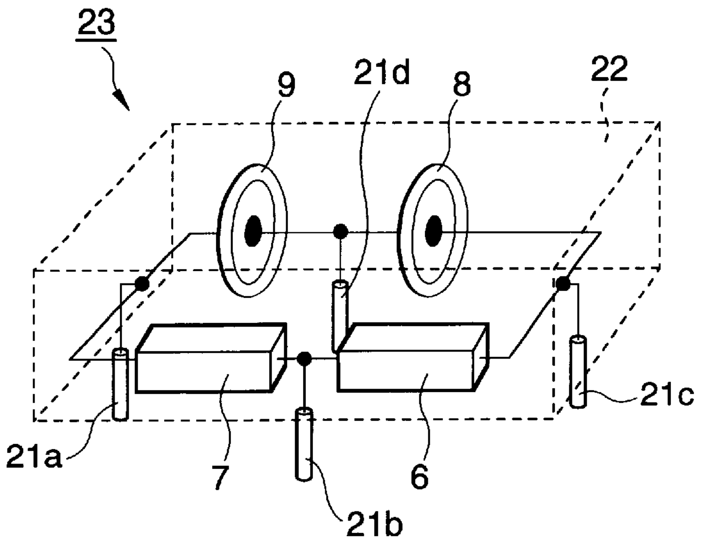
FIG. 2A is a drawing to show the internal configuration of a high-voltage module in the first embodiment of the invention.
Figure 2B:
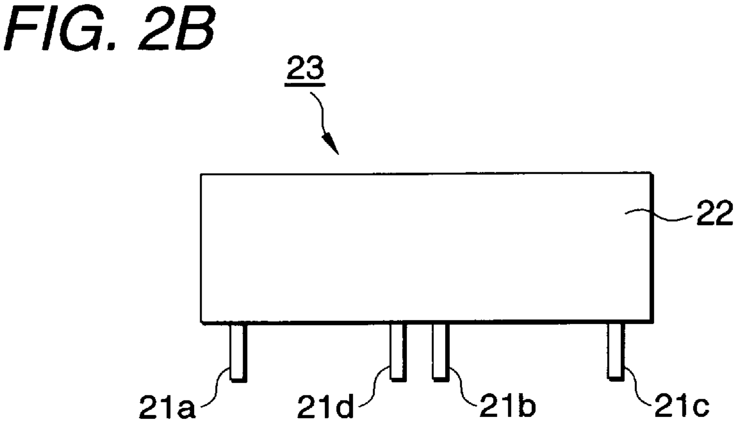
FIG. 2B is an external view of the high-voltage module from one side thereof.
Figure 2C:
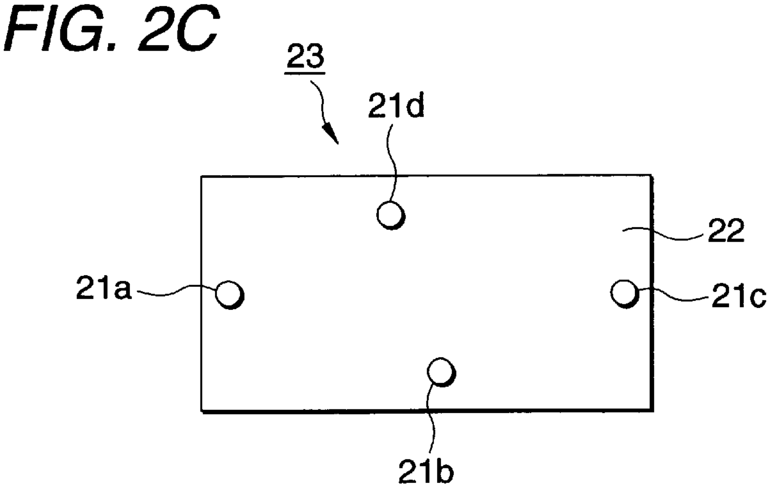
FIG. 2C is an external view of the high-voltage module from the bottom thereof.

FIGS. 2A to 2C show a high-voltage module 23 comprising the high-voltage circuit 4 molded of a resin; FIG. 2A is a drawing to show the internal configuration of the high-voltage module; FIG. 2B is an external view of the high-voltage module from one side thereof; and FIG. 2C is an external view of the high-voltage module from the bottom thereof. The high-voltage diodes 6 and 7 are connected internally and a terminal pin 21*b* is drawn out from the middle point of the high-voltage diodes 6 and 7. The high-voltage capacitor 8, 9 forms an electrode by silver printing, etc., so as to face the surface of a ceramic dielectric disk in a bare chip state in which a ceramic capacitor is not coated with a powder outside resin film. Originally, to use the high-voltage capacitor 8, 9 solely, it is covered with a powder outside resin film of an epoxy resin, etc., however, to mold the whole high-voltage circuit of a resin as in the embodiment, the high-voltage capacitors 8 and 9 need not be covered with a powder outside resin film and thus ceramic high-voltage capacitors of bare chips are used. Of course, finished products of ceramic high-voltage capacitors covered with a powder outside resin film may be used. Use of film capacitor rather than ceramic capacitors is also possible, needless to say.

The high-voltage capacitors 8 and 9 are also connected based on the circuit configuration and a terminal pin 21*d* is drawn out from the middle point of the high-voltage capacitors 8 and 9. Other parts making up the high-voltage circuit 4 are connected and terminal pins 21*a* and 21*c* for connecting to peripheral circuits are also drawn out. In this state, the whole is covered with a mold resin 22, whereby the high-voltage circuit 23 is formed. Here, the discharge resistor 10 not related to the essential function is omitted, but may be inmolded, of course. FIG. 2B is an external view of the high-voltage module from one side thereof and the four terminal pins 21*a* to 21*d* for connecting to peripheral circuits are exposed. FIG. 2C is an external view of the high-voltage module from the bottom thereof and the terminal pins are exposed and projected from the high-voltage module. The terminal pins 21*a* to 21*d* are inserted into holes of a printed circuit board 5 for mounting the high-voltage module.

Of course, like the high-voltage capacitors, the high-voltage diodes can also be used in a bare chip state covered with no resin mold. To miniaturize the whole high-voltage module, it is desirable to bring the components close to each other if the insulation reliability can be provided.

For the resin, generally such an epoxy resin for sealing a semiconductor or the like is a promising candidate; it may be any material if it can provide reliability for insulation performance or the operating environment. For the method, various techniques of injection molding, powder molding, etc., are also available; an appropriate one may be selected considering the reliability, cost efficiency, etc.

Figure 5:
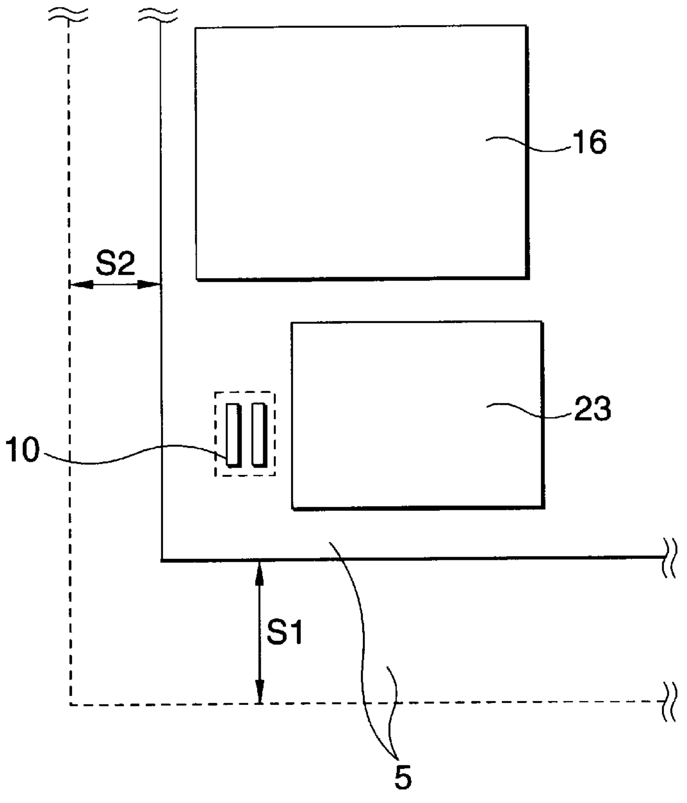
FIG. 5 is an appearance block diagram of a high-voltage circuit and the proximity thereof from the top in the first embodiment of the invention.
Figure 6:
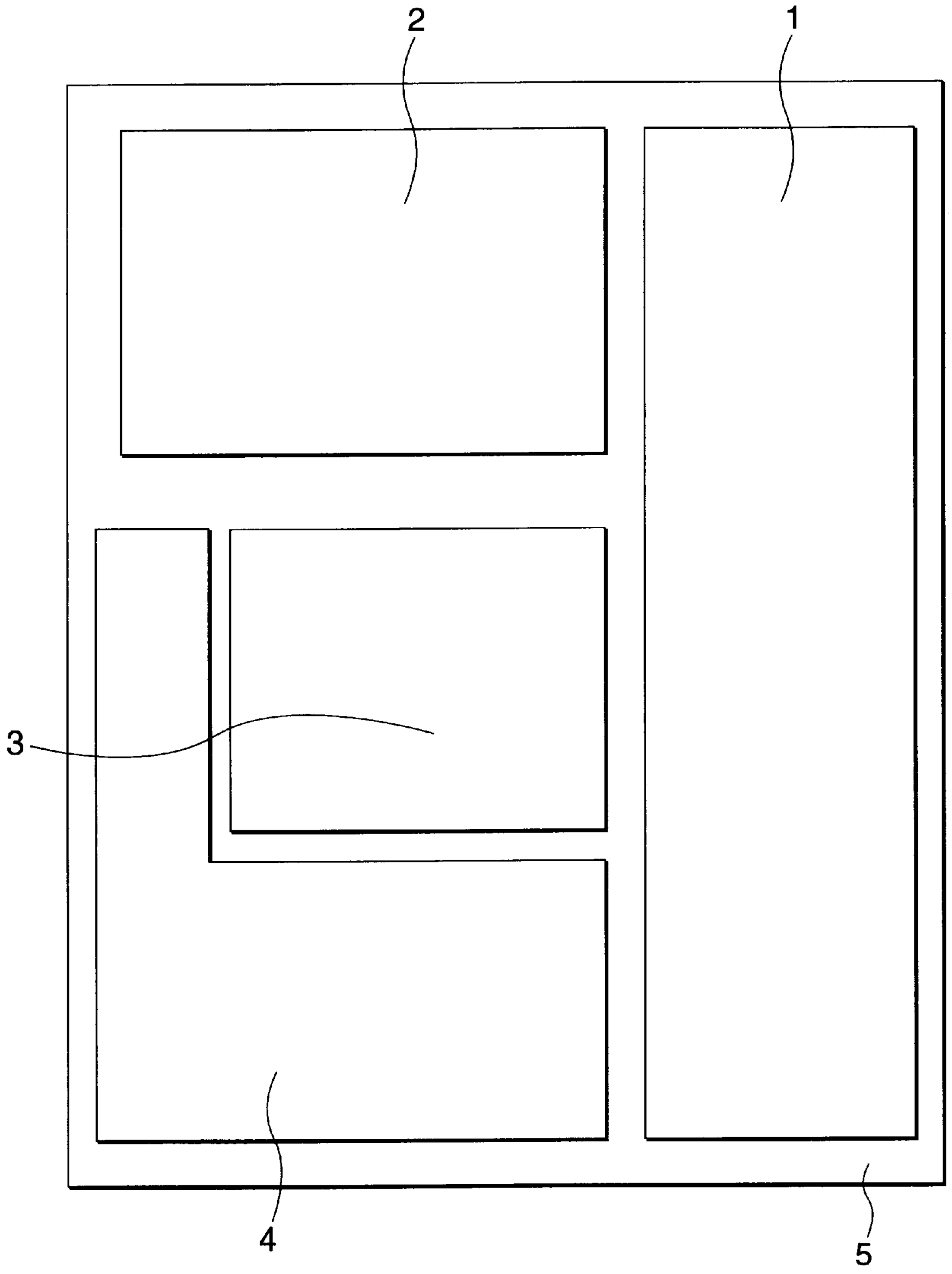
FIG. 6 is an appearance block diagram of an inverter power supply in a related art from the top thereof.
Figure 7:
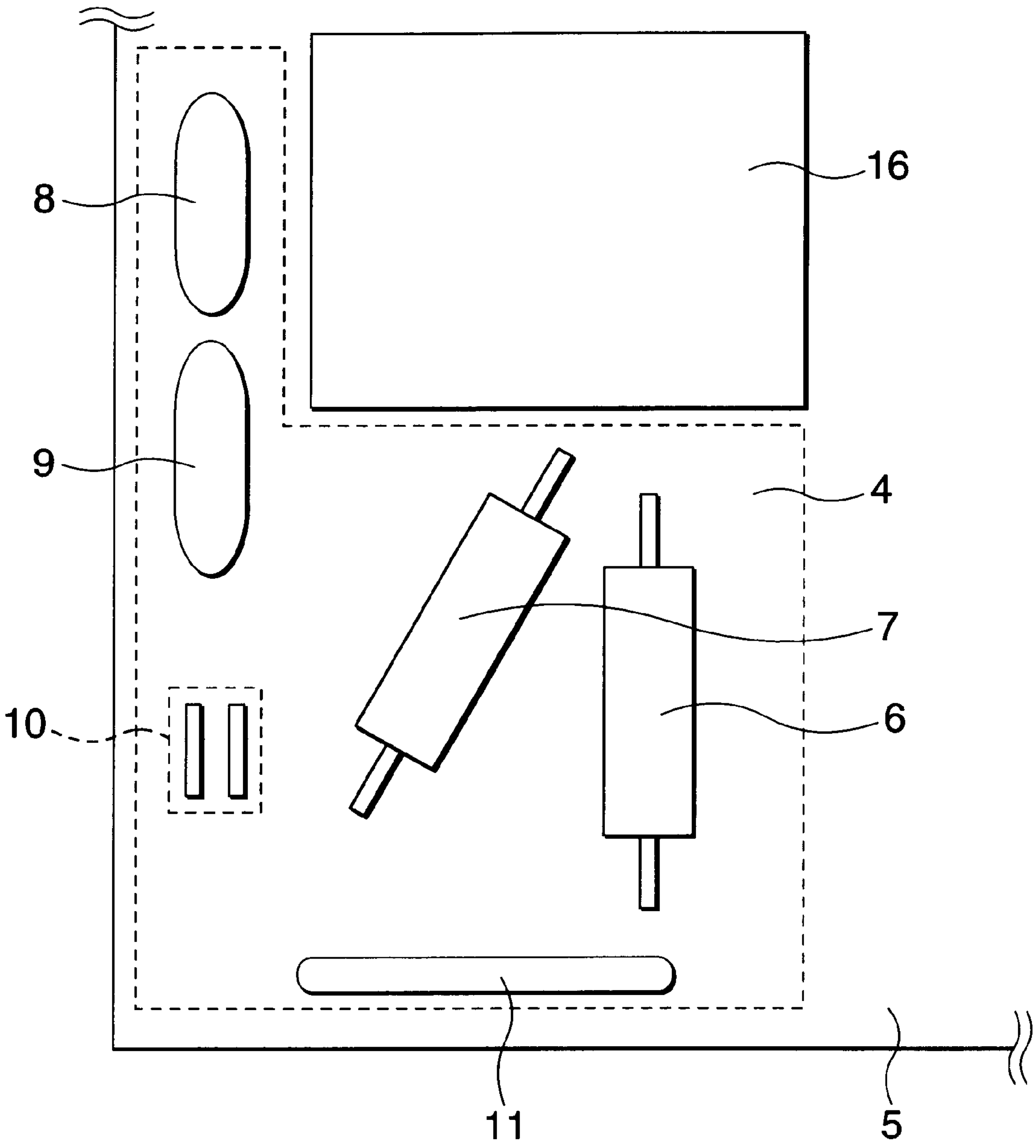
FIG. 7 is an appearance block diagram of a high-voltage circuit and the proximity thereof from the top in the inverter power supply in the related art.

FIG. 5 is a parts layout plan of the high-voltage circuit and its periphery to use the high-voltage module. The parts of the high-voltage circuit 4 placed discretely to provide the insulating distances in FIG. 7 are shrunk in the high-voltage module 23 in one piece. The dash line indicates the outside shape of the inverter power supply in the related art. The printed circuit board 5 of the invention can also be miniaturized as much as the horizontal and vertical dimensions indicated by S1 and S2 and is sized in the range of 10 to 20 mm, so that the inverter power supply can also be miniaturized.

Second Embodiment

Figure 4:
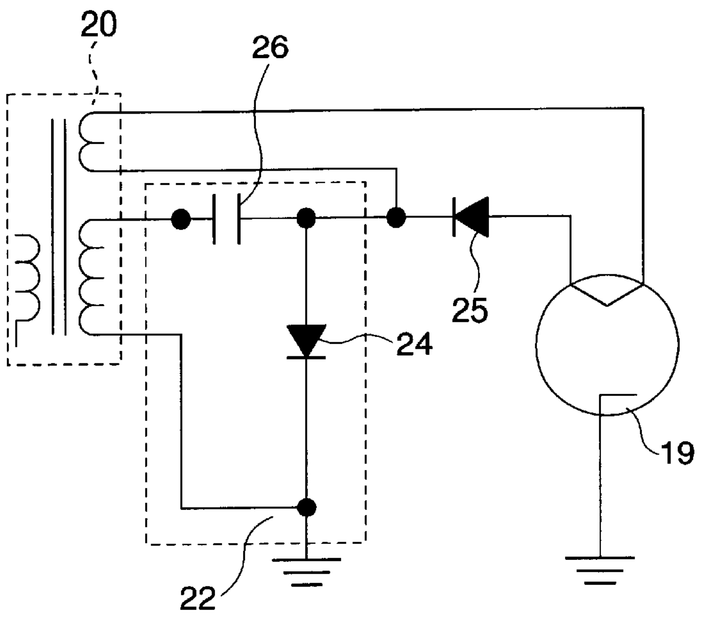
FIG. 4 is a circuit diagram of a high-voltage circuit using a half-wave voltage doubler circuit in the second embodiment of the invention.

A second embodiment of the invention will be discussed with reference to the accompanying drawings. FIG. 4 is a circuit diagram of the main part of a high-voltage circuit of the invention. The high-voltage circuit is a circuit generally called a half-wave voltage doubler circuit and has a generally well known circuit configuration. It comprises a high-voltage diode 24 and a high-voltage capacitor 26 for doubling half-wave voltage and a high-voltage diode 25 for eliminating the effect of magnetron impedance on an inverter circuit at the non-oscillation time. With the full-wave voltage doubler circuit, the magnetron oscillates in both the forward period of the inverter power supply (in the circuit in FIG. 1, the period in which the semiconductor switching element 17 is on) and the flyback period (in FIG. 1, the period in which the semiconductor switching element 17 is off and the tank circuit resonates); with the half-wave voltage doubler circuit, a magnetron oscillates in either of the periods and the halt time is much, so that the high-voltage capacitor is also required to have a comparatively large capacity and generally a film capacitor rather than a ceramic capacitor is used.

Figure 3A:
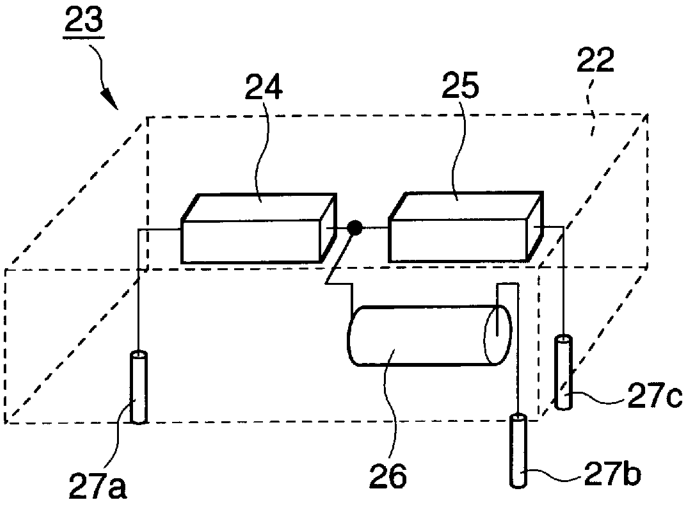
FIG. 3A is a drawing to show the internal configuration of a high-voltage module in a second embodiment of the invention.
Figure 3B:
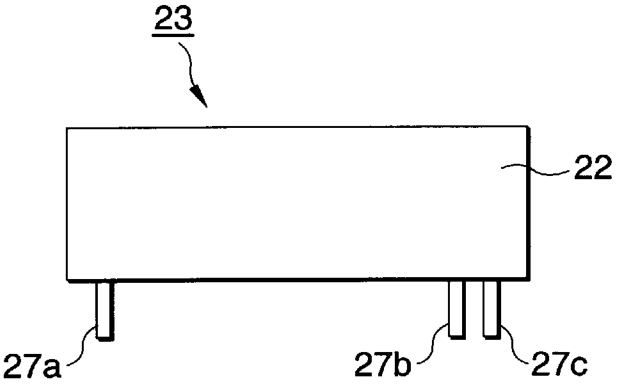
FIG. 3B is an external view of the high-voltage module from one side thereof.
Figure 3C:
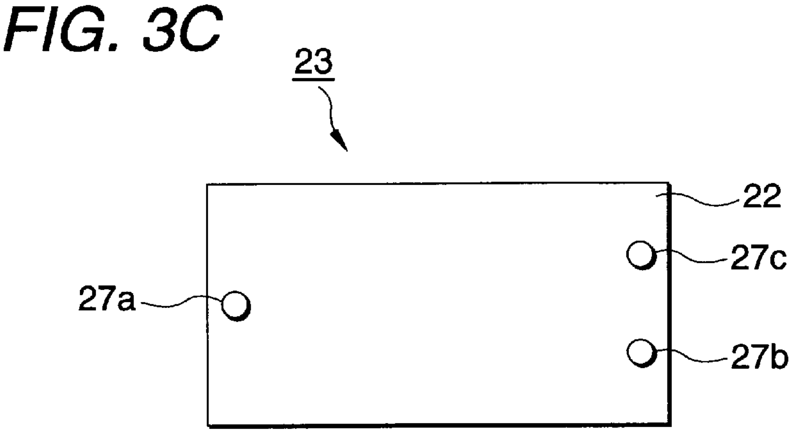
FIG. 3C is an external view of the high-voltage module from the bottom thereof.

In FIG. 1, the high-voltage circuit 4 surrounded by the dash line is formed as a high-voltage module 23. FIGS. 3A to 3C show the high-voltage module comprising the high-voltage circuit molded of a resin; FIG. 3A is a drawing to show the internal configuration of the high-voltage module; FIG. 3B is an external view of the high-voltage module from one side thereof; and FIG. 3C is an external view of the high-voltage module from the bottom thereof. The high-voltage diodes 24 and 25 are connected and from the middle point thereof, connected to the high-voltage capacitor 26. Resin mold is applied as indicated by 22 and three terminal pins 27*a* to 27*c* are drawn out to the outside, thereby providing the high-voltage module 23. Thus, the high-voltage circuit can be miniaturized as with the full-wave voltage doubler circuit in the first embodiment.

INDUSTRIAL APPLICABILITY

As described above, according to the invention, in the high-voltage circuit requiring insulation distances and having an enlarged mounting area, the high-voltage diodes and the high-voltage capacitors in bare-chip status are collected at a high density, are connected, and are molded of a resin for providing insulation performance, so that the high-voltage circuit is put into a module, whereby the circuit scale can be made small and compact magnetron drive circuit can be provided.

The configuration can be applied regardless of the half-wave voltage doubler circuit or the full-wave voltage doubler circuit.

What is claimed is:

1. A magnetron drive power supply comprising:

a unilateral power supply for converting a commercial power supply into a unilateral power supply;

a rectification filter section for rectifying and smoothing said unilateral power supply;

an inverter section for converting said unilateral power supply provided through said rectification filter section into a high-frequency AC voltage as at least one semiconductor switching element is turned on/off;

a step-up transformer for stepping up an output of said inverter section; and a high-voltage circuit comprising:

two high-voltage capacitors in bare-chip states; and two high-voltage diodes, wherein said high voltage circuit is for full-wave voltage doubling and voltage rectifying of an output of said step-up transformer, and wherein said high-voltage circuit is provided as a unit molded of a resin.

2. The magnetron drive power supply of claim 1 with said high-voltage circuit further comprising a discharge resistor for discharging a voltage charge across said high-voltage capacitors.

3. The magnetron drive power supply of claim 2 wherein said high-voltage diodes are in bare-chip states.

4. A magnetron drive power supply comprising:

a unilateral power supply for converting a commercial power supply into a unilateral power supply, a rectification filter section for rectifying and smoothing said unilateral power supply, an inverter section for converting said unilateral power supply provided through said rectification filter section into a high-frequency AC voltage as at least one semiconductor switching element is turned on/off, a step-up transformer for stepping up an output of said inverter section, and a high-voltage circuit provided as a unit molded of a resin for full-wave rectifying and voltage doubling an output of said step-up transformer, said high-voltage circuit comprising:

two high-voltage capacitors, wherein said two high-voltage capacitors are each in a bare-chip state before being molded in said resin; and two high-voltage diodes, wherein said two high-voltage diodes are each in a bare-chip state before being molded in said resin.

5. The magnetron drive power supply of claim 4 wherein said two high-voltage capacitors and said two high-voltage diodes are brought close to each other to miniaturize said high-voltage circuit, wherein said high-voltage circuit becomes a single one-piece component.

6. The magnetron drive power supply of claim 5 with said high-voltage circuit further comprising a discharge resistor for discharging a voltage charge across said high-voltage capacitors.

7. The magnetron drive power supply of claim 6 further comprising terminal pins for connecting to an external circuit.

8. The magnetron drive power supply of claim 4 with said high-voltage circuit further comprising a discharge resistor for discharging a voltage charge across said high-voltage capacitors.

9. A magnetron drive power supply comprising:

a unilateral power supply for converting a commercial power supply into a unilateral power supply, a rectification filter section for rectifying and smoothing said unilateral power supply, an inverter section for converting said unilateral power supply provided through said rectification filter section into a high-frequency AC voltage as at least one semiconductor switching element is turned on/off, a step-up transformer for stepping up an output of said inverter section, and a high-voltage circuit provided as a unit molded of a resin for half-wave rectifying and voltage doubling an output of said step-up transformer, said high-voltage circuit comprising:

a high-voltage capacitor in a bare-chip state before being molded in said resin; and a high-voltage diode in a bare-chip state before being molded in said resin.

10. The magnetron drive power supply of claim 9 with said high-voltage circuit further comprising a discharge resistor for discharging a voltage charge across said high-voltage capacitor.

* * * * *